United States Patent
Border et al.

(10) Patent No.: US 8,896,712 B2
(45) Date of Patent: Nov. 25, 2014

(54) DETERMINING AND CORRECTING FOR IMAGING DEVICE MOTION DURING AN EXPOSURE

(75) Inventors: John N. Border, Walworth, NY (US);
Todd J. Anderson, Fairport, NY (US);
Aaron T. Deever, Pittsford, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 885 days.

(21) Appl. No.: 11/780,841

(22) Filed: Jul. 20, 2007

(65) Prior Publication Data

US 2009/0021588 A1 Jan. 22, 2009

(51) Int. Cl.
*H04N 5/228* (2006.01)
*H04N 5/232* (2006.01)

(52) U.S. Cl.
CPC ....... *H04N 5/23248* (2013.01); *H04N 5/23254* (2013.01); *H04N 5/23264* (2013.01)
USPC ................ 348/208.4; 348/208.99; 348/208.1; 348/208.3

(58) Field of Classification Search
USPC ................... 348/208.99, 208.1, 208.3, 208.4
See application file for complete search history.

(56) References Cited

U.S. PATENT DOCUMENTS

| | | | |
|---|---|---|---|
| 2,446,791 A | 8/1948 | Schroeder | |
| 2,508,267 A | 5/1950 | Kasperowicz | |
| 2,884,483 A | 4/1959 | Ehrenhaft et al. | |
| 3,725,572 A | 4/1973 | Kurokawa et al. | |
| 4,047,203 A | 9/1977 | Dillon | |
| 4,121,244 A | 10/1978 | Nakabe et al. | |
| 4,390,895 A | 6/1983 | Sato et al. | |
| 4,663,661 A | 5/1987 | Weldy | |
| 4,823,186 A | 4/1989 | Muramatsu | |
| 4,864,339 A | 9/1989 | Gross et al. | 354/202 |
| 4,962,419 A | 10/1990 | Hibbard et al. | |
| 5,018,006 A | 5/1991 | Hashimoto | |
| 5,164,831 A | 11/1992 | Kuchta et al. | 358/209 |
| 5,374,956 A | 12/1994 | D'Luna | |

(Continued)

FOREIGN PATENT DOCUMENTS

| | | |
|---|---|---|
| CN | 101312204 | 11/2008 |
| EP | 0119862 | 9/1984 |

(Continued)

OTHER PUBLICATIONS

International Search Report dated Oct. 12, 2009 for International Application No. PCT/US2009/003974 filed Jul. 7, 2009.

(Continued)

*Primary Examiner* — Antoinette Spinks
(74) *Attorney, Agent, or Firm* — Blakely Sokoloff Taylor & Zafman LLP

(57) ABSTRACT

A system and method for determining and correcting for imaging device motion during an exposure is provided. According to various embodiments of the present invention, multiple sets of image pixels are defined on an image sensor, where each set of pixels is at least partially contained in the output image area of the image sensor. Signals from each set of image pixels are read out once or more during an exposure, motion estimates are computed using signal readouts from one or more sets of image pixels, and signal readouts from one or more sets of the image pixels are processed to form the final output image.

13 Claims, 10 Drawing Sheets

(56) References Cited

U.S. PATENT DOCUMENTS

| | | | |
|---|---|---|---|
| 5,629,734 | A | 5/1997 | Hamilton, Jr. et al. |
| 5,631,703 | A | 5/1997 | Hamilton et al. |
| 5,652,621 | A | 7/1997 | Adams, Jr. et al. |
| 5,949,914 | A | 9/1999 | Yuen |
| 6,112,031 | A | 8/2000 | Stephenson |
| 6,243,133 | B1 | 6/2001 | Spaulding et al. |
| 6,476,865 | B1 | 11/2002 | Gindele et al. |
| 6,535,244 | B1 | 3/2003 | Lee et al. ............... 348/208.1 |
| 6,650,704 | B1 | 11/2003 | Carlson et al. .......... 375/240.01 |
| 6,686,960 | B2 | 2/2004 | Iizuka |
| 6,900,831 | B2 | 5/2005 | Nishiwaki ................. 348/208.5 |
| 6,933,968 | B2 | 8/2005 | Yamazaki ................ 348/208.12 |
| 6,982,746 | B1 | 1/2006 | Kawahara ............... 348/208.99 |
| 7,769,241 | B2 | 8/2010 | Adams et al. |
| 7,830,430 | B2 | 11/2010 | Adams, Jr. et al. |
| 8,017,426 | B2 | 9/2011 | Brady |
| 8,068,153 | B2 | 11/2011 | Kumar et al. |
| 8,111,307 | B2 | 2/2012 | Deever et al. |
| 8,119,435 | B2 | 2/2012 | Brady |
| 2002/0003581 | A1* | 1/2002 | Sato et al. ................ 348/333.11 |
| 2004/0046881 | A1 | 3/2004 | Utagawa |
| 2004/0075667 | A1 | 4/2004 | Burky et al. |
| 2004/0094784 | A1 | 5/2004 | Rhodes et al. |
| 2004/0141659 | A1 | 7/2004 | Zhang |
| 2005/0110002 | A1 | 5/2005 | Noda |
| 2005/0117017 | A1* | 6/2005 | Baer ............................. 348/87 |
| 2005/0128312 | A1* | 6/2005 | Fredlund et al. ........... 348/222.1 |
| 2005/0221541 | A1 | 10/2005 | Metzler et al. |
| 2005/0276475 | A1 | 12/2005 | Sawada |
| 2006/0028554 | A1 | 2/2006 | Usui |
| 2006/0033129 | A1 | 2/2006 | Mouli |
| 2006/0033817 | A1 | 2/2006 | Ishikawa et al. .......... 348/208.2 |
| 2006/0043438 | A1 | 3/2006 | Holm et al. |
| 2006/0114340 | A1 | 6/2006 | Sakurai |
| 2006/0125938 | A1 | 6/2006 | Ben-Ezra et al. ............ 348/241 |
| 2006/0158523 | A1 | 7/2006 | Estevez et al. |
| 2006/0269158 | A1 | 11/2006 | O'Hare et al. |
| 2006/0274156 | A1 | 12/2006 | Rabbani et al. .......... 348/208.99 |
| 2006/0279639 | A1 | 12/2006 | Silverstein et al. ...... 348/208.14 |
| 2007/0024931 | A1 | 2/2007 | Compton et al. ............. 358/512 |
| 2007/0047807 | A1 | 3/2007 | Okada |
| 2007/0138588 | A1 | 6/2007 | Wilson et al. |
| 2008/0166062 | A1 | 7/2008 | Adams et al. |
| 2008/0297634 | A1 | 12/2008 | Uya |
| 2009/0057801 | A1 | 3/2009 | Goushcha et al. |
| 2009/0121306 | A1 | 5/2009 | Ishikawa |
| 2009/0121307 | A1 | 5/2009 | Tennant |
| 2010/0006908 | A1 | 1/2010 | Brady |
| 2010/0253833 | A1 | 10/2010 | Deever et al. |
| 2011/0115957 | A1 | 5/2011 | Brady et al. |
| 2011/0211109 | A1 | 9/2011 | Compton et al. |

FOREIGN PATENT DOCUMENTS

| | | |
|---|---|---|
| EP | 0472299 | 2/1992 |
| EP | 1641045 | 3/2006 |
| EP | 19955783 | 11/2008 |
| GB | 2105143 | 3/1983 |
| JP | 2002-027300 | 1/2002 |
| JP | 2004-289709 | 10/2004 |
| WO | 2006/082186 | 8/2006 |
| WO | WO-2006082186 | 8/2006 |
| WO | WO-2007015765 | 2/2007 |
| WO | 2007/049432 | 5/2007 |

OTHER PUBLICATIONS

Written Opinion dated Jan. 11, 2011 for International Application No. PCT/US2009/003974 filed Jul. 7, 2009.
International Search Report dated Sep. 30, 2009 for International Application No. PCT/US2009/003794 filed Jun. 25, 2009.
Written Opinion dated Jan. 11, 2011 for International Application No. PCT/US2009/003794 filed Jun. 25, 2009.
Non-final office action dated Mar. 23, 2010 for U.S. Appl. No. 12/169,723, filed Jul. 9, 2008.
Final office action dated Jul. 26, 2010 for U.S. Appl. No. 12/169,723, filed Jul. 9, 2008.
Non-final office action dated May 18, 2012 for U.S. Appl. No. 13/012,843, filed Jan. 25, 2011.
International Search Report dated Apr. 29, 2010 for International Application No. PCT/US2010/000521 filed Feb. 23, 2010.
Written Opinion dated Sep. 13, 2011 for International Application No. PCT/US2010/000521 filed Feb. 23, 2010.
Non-final office action dated Feb. 27, 2012 for U.S. Appl. No. 12/401,002, filed Mar. 10, 2009.
International Search Report dated Aug. 10, 2010 for International Application No. PCT/US2010/001640 filed Jun. 7, 2010.
Written Opinion dated Dec. 12, 2011 for International Application No. PCT/US2010/001640 filed Jun. 7, 2010.
Non-final office action dated Aug. 18, 2011 for U.S. Appl. No. 12/480,820, filed Jun. 9, 2009.
International Search Report dated Oct. 7, 2010 for International Application No. PCT/US2010/001725 filed Jun. 16, 2010.
Written Opinion dated Jan. 4, 2012 for International Application No. PCT/US2010/001725 filed Jun. 16, 2010.
International Search Report dated Sep. 3, 2010 for International Application No. PCT/US2010/001678 filed Jun. 11, 2010.
Written Opinion dated Jan. 4, 2012 for International Application No. PCT/US2010/001678 filed Jun. 11, 2010.
European Application No. 08780001.7-1241; First Office Action dated May 22, 2012.
Chinese Patent Application No. 200880025408.7, filed Jul. 7, 2008; Second Office Action dated Mar. 29, 2012.
International Search Report mailed Jun. 24, 2010, for International Application No. PCT/US201000892.
Written Opinion mailed Sep. 27, 2011, for International Application No. PCT/US201000892.
International Search Report mailed Aug. 10, 2010, for International Application No. PCT/US201001054.
Written Opinion mailed Oct. 18, 2011, for International Application No. PCT/US201001054.
International Search Report mailed Aug. 13, 2010, for International Application No. PCT/US201001352.
Written Opinion mailed Nov. 29, 2011, for International Application No. PCT/US201001352.
International Search Report mailed Nov. 30, 2010, for International Application No. PCT/US201001514.
Written Opinion mailed Dec. 6, 2011, for International Application No. PCT/US201001514.
International Search Report mailed Nov. 5, 2010, for International Application No. PCT/US201001813.
Written Opinion mailed Jan. 4, 2012, for International Application No. PCT/US201001813.
International Search Report mailed Oct. 13, 2010, for International Application No. PCT/US201001679.
Written Opinion mailed Jan. 4, 2012, for International Application No. PCT/US201001679.
International Search Report mailed Jan. 26, 2010, for International Application No. PCT/US200808323.
Written Opinion mailed Sep. 30, 2008, for International Application No. PCT/US200808323.
International Search Report mailed Sep. 30, 2009, for International Application No. PCT/US200903334.
Written Opinion mailed Dec. 6, 2010, for International Application No. PCT/US200903334.
International Search Report mailed Sep. 20, 2010, for International Application No. PCT/US1001556.
Written Opinion mailed Nov. 29, 2011, for International Application No. PCT/US1001556.

\* cited by examiner

DETERMINING AND CORRECTING FOR IMAGING DEVICE MOTION DURING AN EXPOSURE

FIELD OF THE INVENTION

This invention relates to imaging device motion that occurs during the exposure of an image. In particular, embodiments of the present invention pertain to digital signal processing methods that determine and correct for imaging device motion occurring during the exposure of an image.

BACKGROUND OF THE INVENTION

Current digital cameras suffer from poor performance in low-light situations, when either a flash is not available, or is not beneficial. Exposure time can be increased to boost the number of photons reaching the sensor, but this solution typically reduces sharpness in the image if there is any motion in the scene or if the camera is not held absolutely steady. Digital cameras can also artificially boost the light intensity with a digital gain factor. The gain factor effectively scales upward the output codevalue for each pixel. The problem with this technique is that it amplifies noise as well as signal content. Low-light images typically have low signal-to-noise ratios, and the gain factor required to boost the images to acceptable intensity levels also causes unacceptable noise levels to be present in the images as well.

One method for controlling camera motion during an exposure is to force the exposure period to be very short, for example, $1/240^{th}$ of a second. Such a short exposure is insufficient under many conditions, however, and results in an underexposed, noisy image.

Optical image stabilization has also been proposed to compensate for camera motion during an exposure. Optical image stabilization is typically accomplished during image capture by the use of a gyroscopic measurement accompanied by a controlled movement of a lens assembly mounted with lateral actuators. Prior art discloses a series of methods for gyroscopic measurement and lateral lens movement. Optical image stabilization is costly due to the need for gyroscopic measurements in multiple directions and the need for lateral actuators in the lens system likewise in multiple directions.

Alternatively, blur in the captured image can be reduced after image capture based on measurements of the camera motion that occurred during the image capture. Improved accuracy in the measurement of the camera motion will generally produce better results from the deblurring algorithm. Prior art on methods to track this camera motion can be divided into two general categories. One category is to track the camera's motion using a mechanical method, such as with gyroscopic measurements. This method can be costly due to the need for additional mechanical equipment in the image capture device. The other category for tracking camera motion is by deriving motion information from the captured image itself or from a series of captured images. These solutions are sometimes referred to as electronic image stabilization.

Such a method for correcting for camera motion during exposure includes capturing a burst of images, each at a fraction of the total desired exposure time. The multiple frames are aligned and combined to correct for camera motion and provide an output image with the desired total exposure time. The drawbacks of this method include sensor limitations on how quickly a frame of image data can be read off of the sensor, as well as memory costs for storing multiple images.

Another method for correcting for camera motion during exposure is the use of a blind deconvolution algorithm. Examples of blind deconvolution algorithms, such as the Lucy-Richardson algorithm, are well known to those skilled in the art, and can be used to reduce camera motion blur. The drawback of blind deconvolution algorithms is that they assume no a priori knowledge of the motion during the exposure, and their performance is therefore limited relative to techniques that have knowledge of the motion that occurred during exposure.

Another method for estimating camera motion during exposure involves the use of a first portion of a CMOS image sensor dedicated to collecting data to be used for motion estimation, while a second portion of the image sensor represents the image area. The first portion is usually a strip of rows from the top and/or bottom of the sensor area, and can be read multiple times during the exposure of the second part of the sensor. These readouts are used to estimate the camera motion during the exposure of the second portion of the sensor. The drawbacks of this method include the decrease in spatial resolution of the output image due to the sensor pixels dedicated to motion estimation. Additionally, strips of data along the top and/or bottom of the sensor often provide insufficient information for determining global motion.

Another method for estimating camera motion during exposure includes the simultaneous use of a separate sensor to capture data for motion estimation. Drawbacks of this method include the extra cost and space required for an extra sensor.

Accordingly, a need in the art exists for an improved process for determining and correcting for camera motion during exposure.

SUMMARY

The above described problem is addressed and a technical solution is achieved in the art by systems and methods for determining and correcting for motion of an imaging device, such as a digital still camera or a digital video camera, during an exposure according to various embodiments of the present invention.

According to an embodiment of the present invention, multiple sets of image element acquisition devices, such as CCDs known in the art, are defined on an image sensor. Image element acquisition devices are commonly referred to herein as "pixels" or "image pixels" for purposes of clarity. During capture, signals from a first set of image element acquisition devices, such as CCDs, known in the art, are read out one or more times. Signals from a second set of image element acquisition devices also are read out one or more times. Readouts from at least the first set of image element signals are used to determine estimates of the imaging device motion during the exposure period. Readouts from at least some of the second set of image element signals are used to assemble an output image based at least upon the determined motion.

In some embodiments of the present invention, four sets of image element acquisition devices are defined on an image sensor. During capture, a first set of image element signals are read out one or more times from a first of the four sets of image element acquisition devices. Respectively, second, third, and fourth sets of image element signals are also read out one or more times from the corresponding sets of image element acquisition devices. Readouts from at least the first set of image elements are used to generate estimates of the imaging device motion during the exposure period. Readouts from at least the second, third and fourth sets of image elements are used to assemble the output image.

In some embodiments of the present invention, readouts from the sets of image element acquisition devices used to assemble the output image are processed. This processing may include deblurring, spatial alignment and sharpening, as well as discarding of some of the data.

According to some embodiments of the present invention, the first set of image element acquisition devices may be a contiguous or substantially contiguous group of image element acquisition devices. The location of this first set of image element acquisition devices may be determined independently of the image scene to be captured, or it may be at least partially derived from an analysis of the image scene prior to capture.

According to other embodiments of the present invention, the first set of image element acquisition devices may be formed by a non-contiguous or substantially non-contiguous group of image element acquisition devices.

In some embodiments of the present invention, the image element signals are generated by a destructive readout of the image element acquisition devices. In other embodiments of the present invention, signals from at least the first set of image elements are generated by a non-destructive readout of the image element acquisition devices.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION

Because digital imaging devices employing image sensors and related circuitry for signal processing are well known, the present description will be directed in particular to elements forming part of, or cooperating more directly with, apparatus in accordance with embodiments of the present invention. Elements not specifically shown or described herein may be selected from those known in the art. Certain aspects of the embodiments to be described may be provided in software. Given the system as shown and described, according to embodiments of the invention, in the following materials, software not specifically shown, described or suggested herein that is useful for implementation of embodiments of the invention is conventional and within the ordinary skill in such arts.

Figure 1:
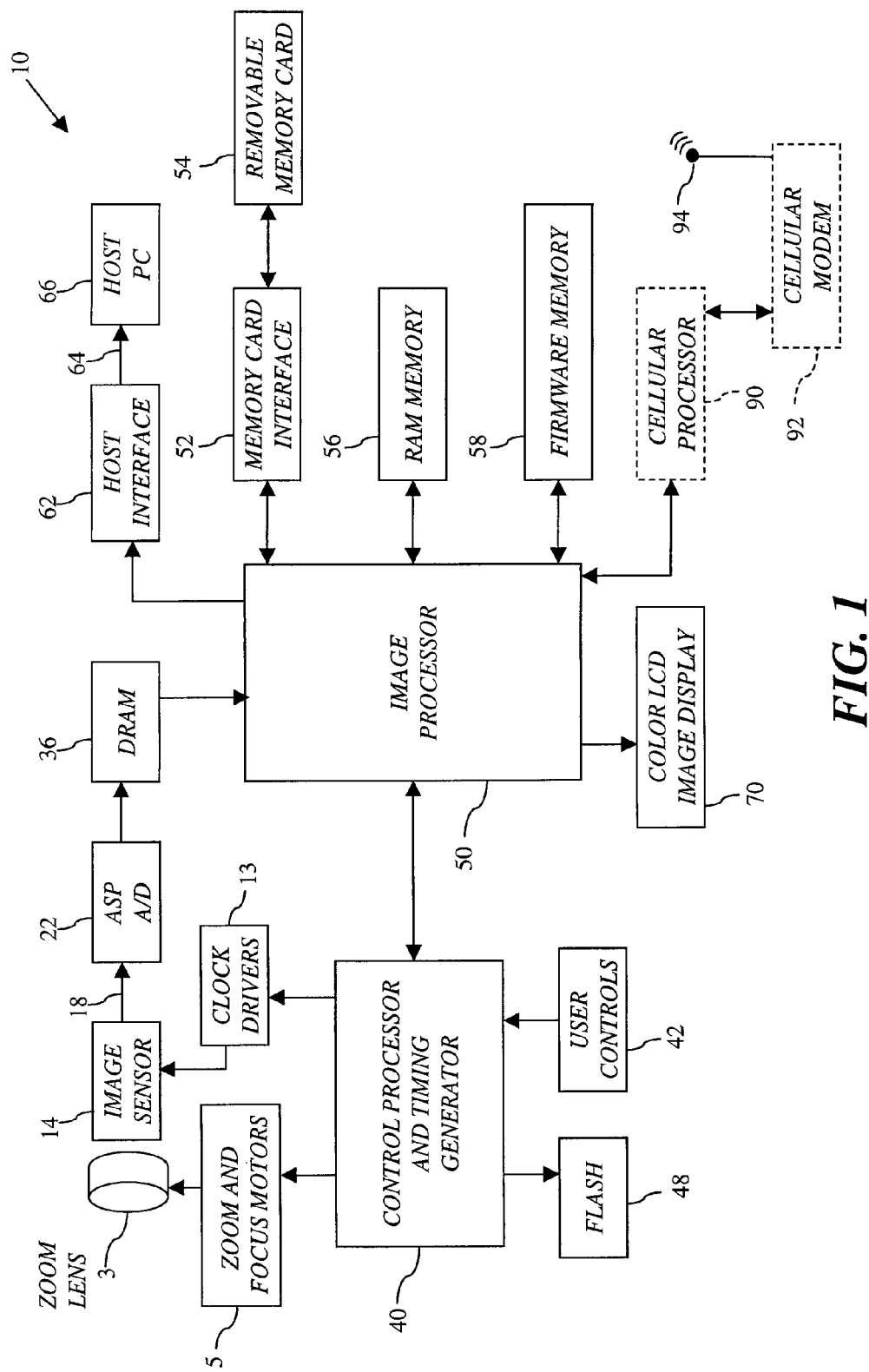
FIG. 1 depicts a block diagram of an example of a system, according to an embodiment of the present invention.

FIG. 1. depicts a block diagram of an example of a digital imaging device 10, according to an embodiment of the present invention. Digital imaging device 10 is a portable battery operated device, small enough to be easily handheld by a user when capturing and reviewing images. The digital imaging device 10 preferably produces both still digital images and motion digital image sequences (e.g. video clips) that are stored on a removable memory card 54. Alternatively, the digital imaging device may produce and store only still digital images.

The digital imaging device 10 includes a zoom lens providing an image to a corresponding image sensor. The zoom lens 3 is controlled by zoom and focus motors 5, and provides an image to the image sensor 14. An adjustable lens aperture (not shown) is used to control the exposure of the image sensor 14, along with an electronic exposure time control provided to the image sensor 14 by the control processor and timing generator 40.

In some preferred examples, the image sensor 14 is a single-chip color Megapixel CMOS sensor, using the well-known Bayer color filter pattern to capture color images. The image sensor 14 can have, for example, a 4:3 image aspect ratio and a total of 6.1 MP effective megapixels (million pixels), with 2848 active columns of pixels×2144 active rows of pixels. A control processor and timing generator 40 controls the image sensor 14 by supplying signals to clock drivers 13.

In other preferred examples, the image sensor 14 may have some pixels for which the filter passes all wavelengths of visible light. Such a sensor is described in "Image Sensor with Improved Light Sensitivity," US20070024931A1, by John T. Compton and John F. Hamilton.

The control processor and timing generator 40 also controls the zoom and focus motors 5, and a flash 48 for emitting light to illuminate the scene. User controls 42 are used to control the operation of the digital imaging device 10.

The analog output signals 18 from the image sensor 14 are amplified and converted to digital image signals by an analog signal processor and A/D converter 22 and provided to a DRAM buffer memory 36. The image data stored in the DRAM buffer memory 36 is processed by a data processing system, such as an image processor 50, to produce a processed digital image file, which may contain a motion image sequence or a still digital image. It should be noted that the control processor and timing generator 40 may also be considered to be part of the data processing system.

The processing performed by the image processor 50 is controlled by firmware stored in a processor-accessible memory system, which may include a firmware memory 58, which can be flash EPROM memory. The processor 50 processes the digital input images from the DRAM buffer memory 36, using the processor-accessible memory system, which may include a RAM memory 56, to store intermediate results during the processing stage.

It should be noted that the image processor 50, while typically a programmable image processor, can alternatively be a hard-wired custom integrated circuit (IC) processor, a general purpose microprocessor, or a combination of hard-wired custom IC and programmable processors. Furthermore, one or more of the functions shown as separate blocks in FIG. 1, such as the DRAM buffer memory 36 and the RAM memory 58, can be incorporated as a processor-accessible memory system in an IC containing the image processor 50.

The processed digital image file may be stored in the processor-accessible memory system, which also may include a removable memory card 54 accessed via a memory card interface 52. Removable memory cards 54 are one type of removable digital image storage medium that may be a part of the processor-accessible memory system, and are available in several different physical formats. For example, the removable memory card 54 can include (without limitation) memory cards adapted to well-known formats, such as the Compact Flash, SmartMedia, MemoryStick, MMC, SD, or XD memory card formats. Other types of removable digital image storage media, such as magnetic hard drives, magnetic tape, or optical disks, can alternatively be used to store the still and motion digital images. Alternatively, the digital imaging device 10 can use internal non-volatile memory (not shown), such as internal Flash EPROM memory to store the processed digital image files. In such an example, the memory card interface 52 and the removable memory card 54 are not needed.

The image processor 50 performs various image processing functions, including color interpolation followed by color and tone correction, in order to produce rendered color image data. If the imaging device is in still image mode, the rendered color image data is then JPEG compressed and stored as a JPEG image file on the removable memory card 54. The rendered color image data may also be provided to a host PC 66 via a host interface 62 communicating over a suitable interconnection 64, such as a SCSI connection, a USB connection or a Firewire connection. The JPEG file preferably uses the so-called "Exif" image format defined in "Digital Still Camera Image File Format (Exif)" version 2.2 by the Japan Electronics and Information Technology Industries Association (JEITA), Tokyo, Japan. This format includes an Exif application segment that stores particular image metadata, including the date/time the image was captured, as well as the lens f/number and other camera settings.

If the imaging device is in motion image mode, the rendered color image data is stored on the removable memory card 54 using the well-known QuickTime format developed by Apple Computer Inc. It is understood that other motion image formats can be employed using various known compression technologies such as MPEG-1, MPEG-2, MPEG-4, H.263, H.264, and the like. In motion image mode, the rendered color image data may also be provided to a host PC 66 via a host interface 62 communicating over a suitable interconnection 64.

The image processor 50 also creates a low-resolution "thumbnail" size image of the still image, or of a suitable frame of the motion image. This thumbnail size image can be created as described in commonly-assigned U.S. Pat. No. 5,164,831, entitled "Electronic Still Camera Providing Multi-Format Storage Of Full And Reduced Resolution Images" and issued in the name of Kuchta, et al. After still and motion images are captured, they can be quickly reviewed on a color LCD image display 70 by using the thumbnail images to select desired still images or motion image sequences. The graphical user interface displayed on the color LCD image display 70 is controlled by the user controls 42.

In some embodiments of the present invention, the digital imaging device 10 is included as part of a camera phone. In such examples, the image processor 50 also interfaces to a cellular processor 90, which uses a cellular modem 92 to transmit digital images to a cellular network (not shown) using radio frequency transmissions via an antenna 94.

Figure 2:
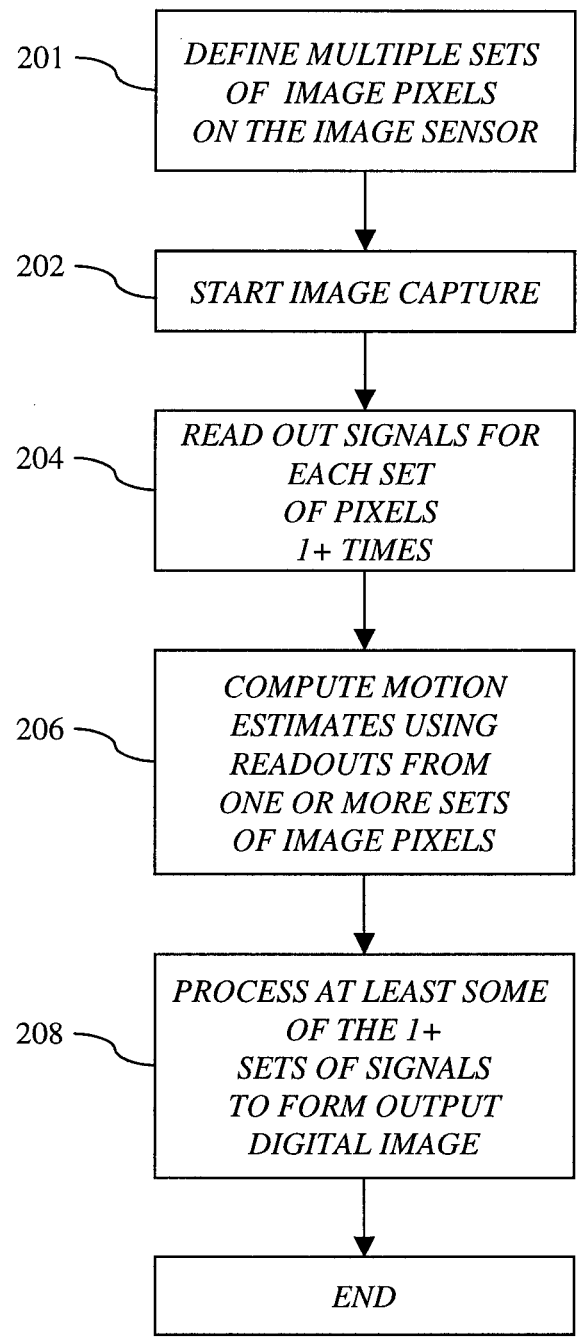
FIG. 2 depicts a block diagram for determining and correcting for imaging device motion during an exposure, according to an embodiment of the present invention.
Figure 3:
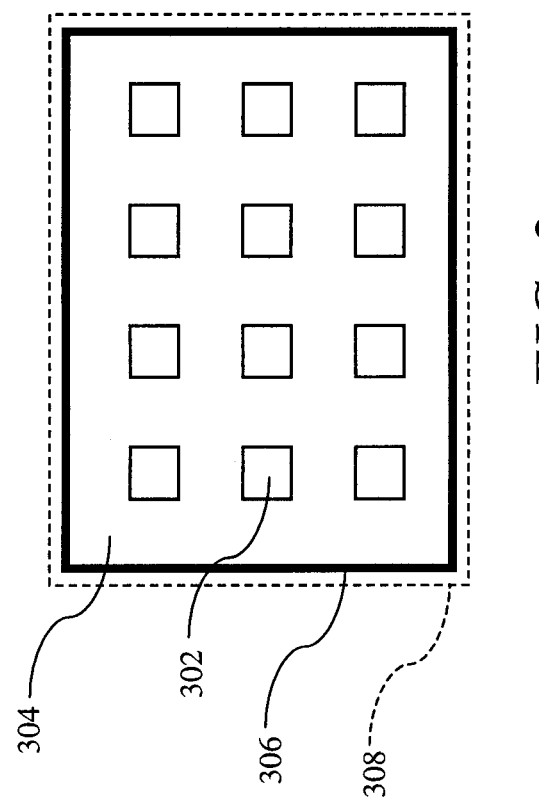
FIG. 3 illustrates an example of a first set and second set of image pixels, according to an embodiment of the present invention.
Figure 4:
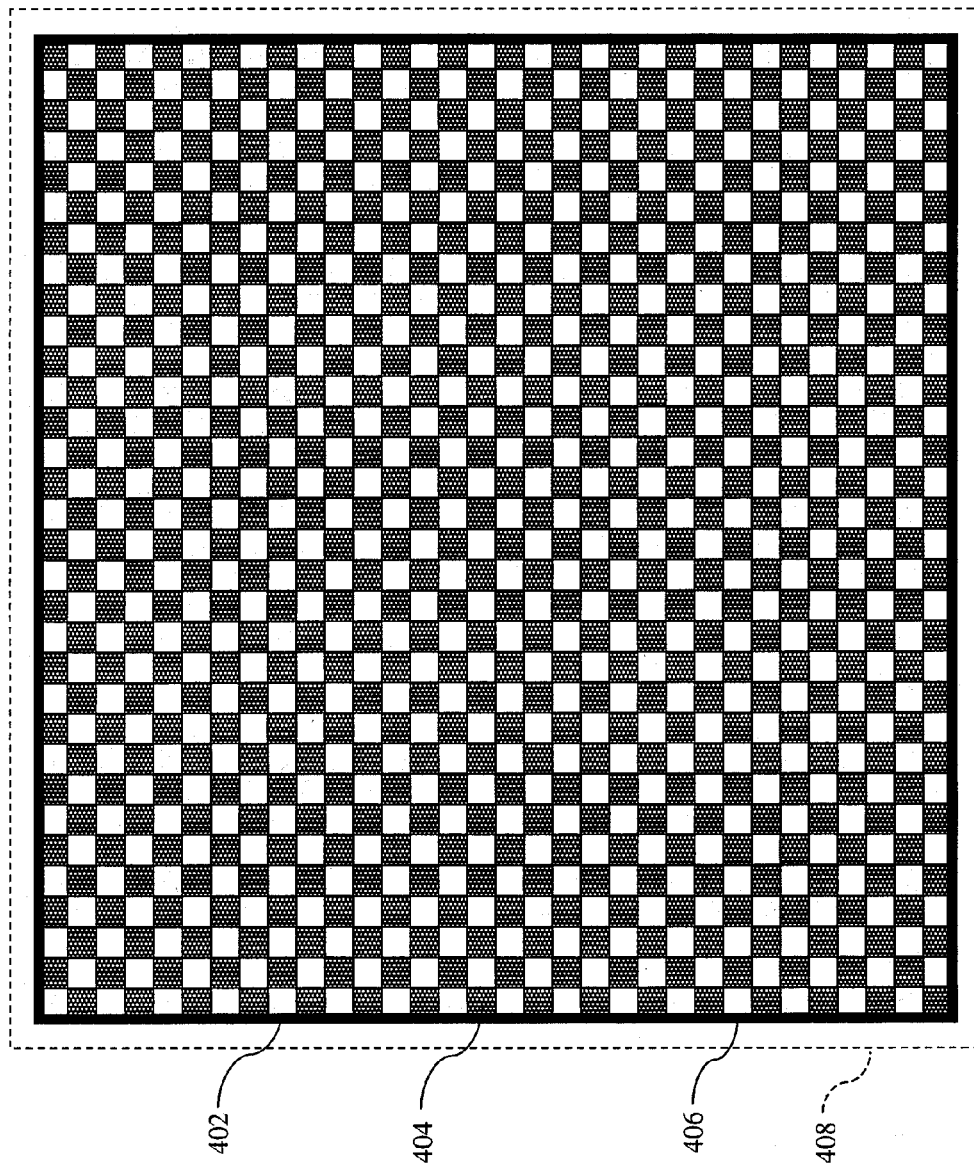
FIG. 4 illustrates another example of a first set and second set of image pixels, according to an embodiment of the present invention.
Figure 5:
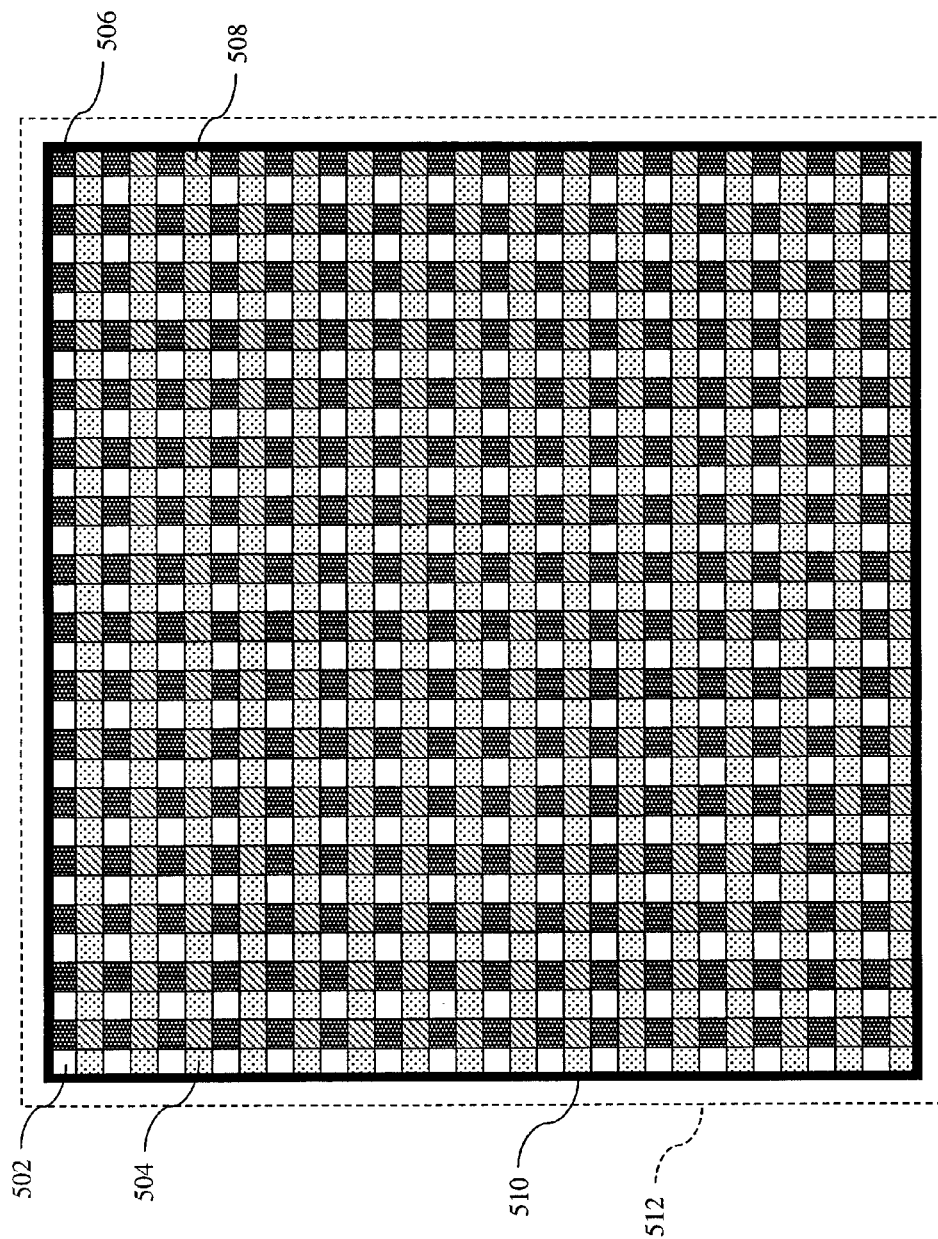
FIG. 5 illustrates an example of a first, second, third and fourth set of image pixels, according to an embodiment of the present invention.

FIG. 2 depicts a flow chart of an embodiment of the present invention for determining and correcting for imaging device motion during an exposure. Initially, multiple sets of pixels are defined on the image sensor 201. FIGS. 3-5 illustrate exemplary methods for defining multiple sets of pixels on the image sensor according to embodiments of the present invention. In FIG. 3, two sets of pixels are defined on the image sensor 308. A first set of pixels 302 comprises a collection of contiguous blocks of pixels spaced throughout the image sensor. The blocks may be of any size, shape and location throughout the image sensor, however, in a preferred embodiment of the present invention, the blocks are square and are spaced evenly throughout the image sensor. A second set of pixels 304 comprises the entire image sensor. Thus the first set of pixels is a subset of the second set of pixels. Both the first and the second set of pixels have non-empty overlap with the output image area region of the image sensor 306. The output image area corresponds to those pixels that comprise the output image produced by the imaging device. The sensor may have additional pixels which are not included in the output image.

In FIG. 4, two non-contiguous or disjoint sets of image pixels are defined on the image sensor 408 in the pattern of a checkerboard over the output image area region of the image sensor 406. The first set of pixels 402 comprises ½ the pixel locations. The second set of pixels 404 comprises the other ½ of the pixel locations.

In FIG. 5, four disjoint sets of image pixels are defined on the image sensor 512 such that the four sets appear in a consistent pattern on every 2×2 region of the output image area of the image sensor 510. The first set of pixels 502 comprises ¼ of the pixel locations. Similarly, the second set of pixels 504, the third set of pixels 506, and the fourth set of pixels 508 each comprise a separate ¼ of the pixel locations.

Returning to FIG. 2, once the multiple sets of pixels have been defined, the image capture begins 202. In an alternative embodiment of the present invention, it is also possible to define the multiple sets of pixels immediately after image capture begins, based on, for example, analysis of the imaging device capture settings. After image capture has commenced, each set of pixels is read out from the image sensor one or more times 204.

Figure 6:
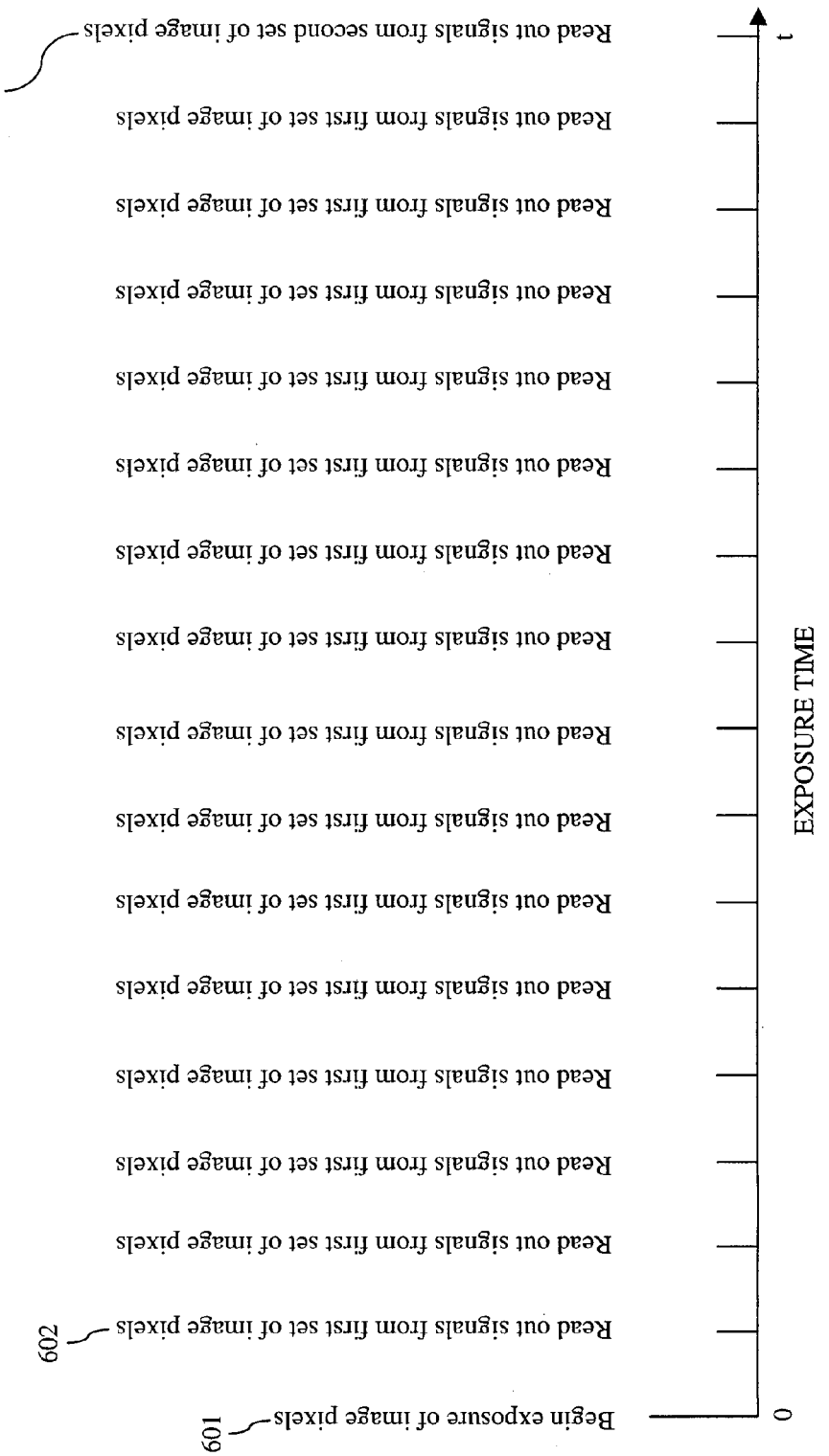
FIG. 6 illustrates an example of the readouts of the first and second sets of image pixels, according to an embodiment of the present invention.

FIG. 6 depicts an exemplary method for image sensor readout corresponding to the pixel sets described in FIG. 3. At time 0, the exposure begins 601. Note that the image sensor may have any variety of exposure, shutter and readout systems. In one example, the sensor has a global shutter such that all pixels of a given set begin an exposure period simultaneously. Subsequently, the pixel data signals (i.e., image element signals) corresponding to a given set are simultaneously transferred to a light-shielded storage location, and read out from the sensor. In another example, the sensor has a rolling shutter system, in which rows of image sensor pixels have slightly offset integration periods according to the readout speed of the sensor. This approach allows each row of the sensor to receive an equal period of integration without requiring light shielded temporary storage for the signals.

In some embodiments of the invention, the sensor image-pixel-signals (i.e., image element signals) are read out destructively, such that a signal is read out from a sensor pixel, and the pixel is subsequently reset. In other embodiments of the invention, the sensor image pixels are read out nondestructively, such that a signal is read out from a sensor pixel location without resetting the pixel. These examples are not meant to be limiting, and those skilled in the art will recognize that the present invention applies to other sensor designs as well.

In FIG. 6, image element signals from the first set of pixels 602 are read out multiple times, while image element signals from the second set of pixels 604 are read out only once at the conclusion of the exposure at time t. Like FIGS. 8 and 9, discussed below, each row in FIG. 6 may be considered the instructed transmission of image element signals from a set of image element acquisition devices. In the specific embodiment of FIG. 6, every row (602) but the last row may be considered the instructed transmission of first image element signals from a first set of the image element acquisition devices comprising some, but not all of the plurality of image element acquisition devices. The last row (604) of FIG. 6 may be considered the instructed transmission of second image element signals from a second set of the image element acquisition devices comprising some or all of the plurality of image element acquisition devices.

Referring back to FIG. 2, the data from the readouts is then used to compute motion estimates 206. In the example of FIG. 6, the multiple readouts of image element signals from the first set of pixels are used to estimate the imaging device motion. Those skilled in the art will recognize that there are many well-known methods for estimating motion between two sets of image data. In one preferred method of estimating motion between two consecutive readouts of the first set of image pixels, a translational motion estimate is derived for each pair of image-element-signal sets from a same block 302 of pixels. The translational motion estimate can be derived using any well-known technique such as block-matching.

Figure 7:
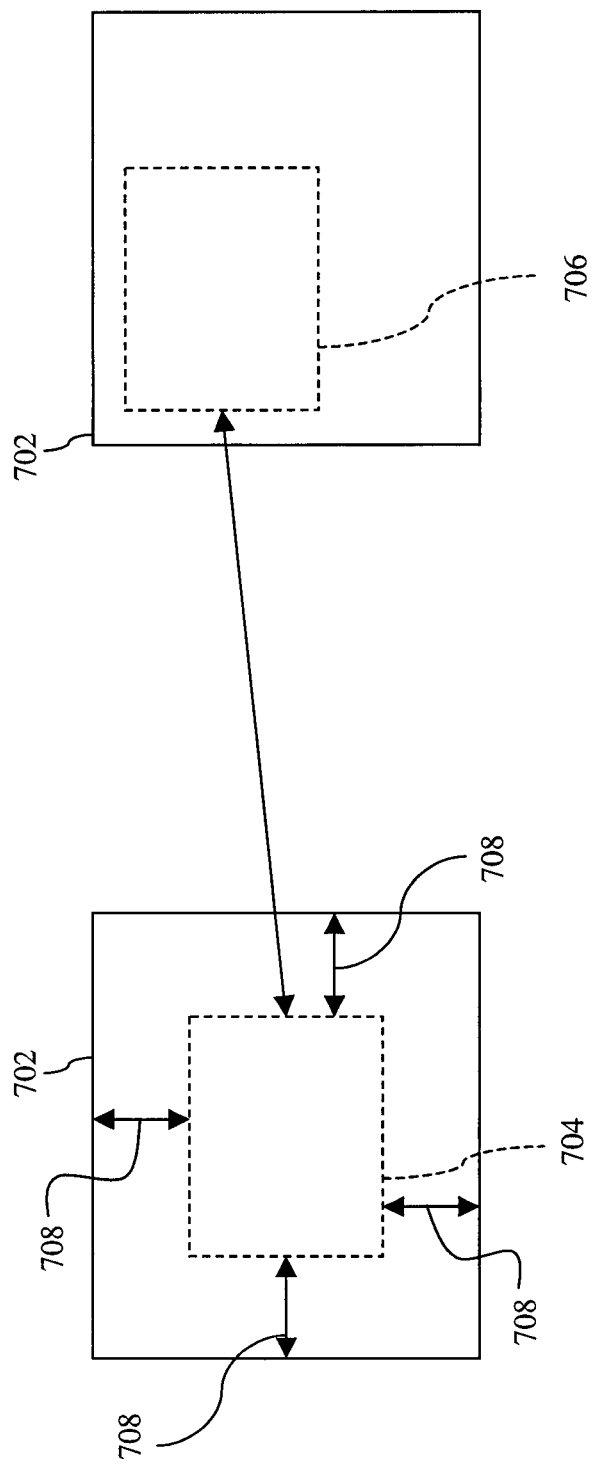
FIG. 7 illustrates a block-matching process between two sets of image data, according to an embodiment of the present invention.

FIG. 7 illustrates the process of finding a motion estimate between two corresponding blocks of image data 702 from consecutive readouts of signals from the first set of image pixels as described for FIG. 6. A sub-block of data 704 from the first readout is chosen as a reference sub-block. The size of this sub-block can be selected so as to allow searching within a desired search range 708 without leaving the overall block image data area. An optimal match for the reference sub-block is found from the second readout 706, and the motion estimate is calculated as the translational offset between the reference and matching sub-blocks.

This process is repeated for each corresponding pair of signals from each block 702 of pixels, resulting in a collection of motion estimates. A global translational motion estimate between the consecutive readouts of signals from the first set of image pixels can be computed as a function of this collection of motion estimates. One such function is to take the mean of the collection of motion estimates. Another such function is to take the median, independently in the horizontal and vertical directions, of the collection of motion estimates. In a preferred embodiment, each corresponding pair of blocks has associated with it not only a motion estimate but also a cost value, indicating the accuracy of the best match. Only a subset of block motion estimates with low associated cost values indicating good matches are included in the calculation of the global motion estimate. The median value of this subset of motion estimates is used as the global motion estimate. It is well-known that individual block motion estimates may reflect local object motion as opposed to global imaging device motion. The preferred approach computes a robust measurement of global motion by excluding block motion estimates with high cost values that are often indicative of noise or local motion, and by utilizing the median of the remaining estimates to avoid any potential remaining outlier data due to local motion.

The data used in computing the motion estimates may be dependent on the spectral sensitivity of the sensor pixels. In a standard Bayer pattern sensor, for example, the green pixels may be used to determine the best match. In a sensor containing panchromatic pixels, these pixels may be used in comparing the quality of various motion offsets. In either case, the data may be interpolated so that a value of a specific spectral sensitivity, for example green or panchromatic, is available at every pixel location.

The location of the blocks of pixels that generate the first set of image data may be predefined as in FIG. 3. In another embodiment, preview data is analyzed just prior to initiating capture. This preview data is used to determine regions of high local contrast within the image scene. The block locations may be chosen to center around the regions of high local contrast, as they often yield improved motion estimation accuracy. The number and location of blocks may be completely unconstrained, or constrained to certain numbers and/or general locations. In one example, the block locations are constrained in the vertical direction, but unconstrained in the horizontal direction. Thus ensures that the total number of rows of sensor data that must be accessed is controlled, to minimize row readout overhead, while allowing flexibility in the horizontal placement of the blocks to maximize potential motion estimation performance.

The motion estimates between consecutive readouts of signals from the first set of image pixels are then combined to form a function of the global motion during the exposure interval [0,t]. Those skilled in the art will recognize that there are many ways of deriving such a function. For example, the motion may be constrained to be piecewise linear, or piecewise constant over each subinterval of time between consecutive readouts of signals from the first set of image pixels. As another example, the motion estimates also may be used to find a least squares fit to a quadratic or cubic polynomial. These examples are not meant to be limiting, and in fact any suitable method for converting the individual motion estimates to a function of the global motion during the exposure interval [0,t] is considered within the scope of this invention.

Referring back to FIG. 2, signals from at least some of the one or more sets of image pixels are then processed to form the output image 208. In the example of FIG. 6, the readout of image element signals from the second set of image pixels 604 at time t represents the signals which are processed to form the output image. In this embodiment, the second set of image pixels comprises the entire sensor image area, and the corresponding image element signals are read out once at the conclusion of the exposure, thus representing the integration of light over the entire exposure interval [0,t].

In this embodiment, the second set of image pixels contains image pixels also belonging to the first set of image pixels. If the multiple readouts of image element signals from the first set of image pixels occurred nondestructively, then when image element signals from the second set of image pixels are read out, this measurement will represent the aggregate integration of light throughout the entire exposure interval for all sensor image pixels. If the multiple readouts of the image element signals from the first set of images pixels occurred destructively, however, then these measurements must be aggregated with the final readout of the image element signals from the second set of image pixels in order to form an exposure measurement corresponding to the entire interval [0,t] in those regions of the sensor that are the union between the first and second set of image pixels.

Those skilled in the art will recognize that there is readout noise associated with each readout of data from a CMOS sensor, and in the case that each readout of signals from the first set of image pixels is performed destructively, the aggregation of these readouts will contain more readout noise than regions of the image sensor that are only read out once at the conclusion of the exposure interval. In such a case, it may be necessary to perform some signal processing to match the noise characteristics of the different regions.

Referring back to FIG. 6, the image element signals from the second set of image pixels read out at time t can be processed to remove motion blur that results from imaging device motion during the exposure. In one embodiment of the present invention, the global motion function derived from the multiple readouts of signals from the first set of image pixels can be used to generate an estimate of the blur point spread function that occurred during the exposure interval [0,t]. The blur point spread function can be input along with signals from the second set of image pixels to an image deconvolution function to produce an enhanced image. Such algorithms are well-known in the art.

Figure 8:
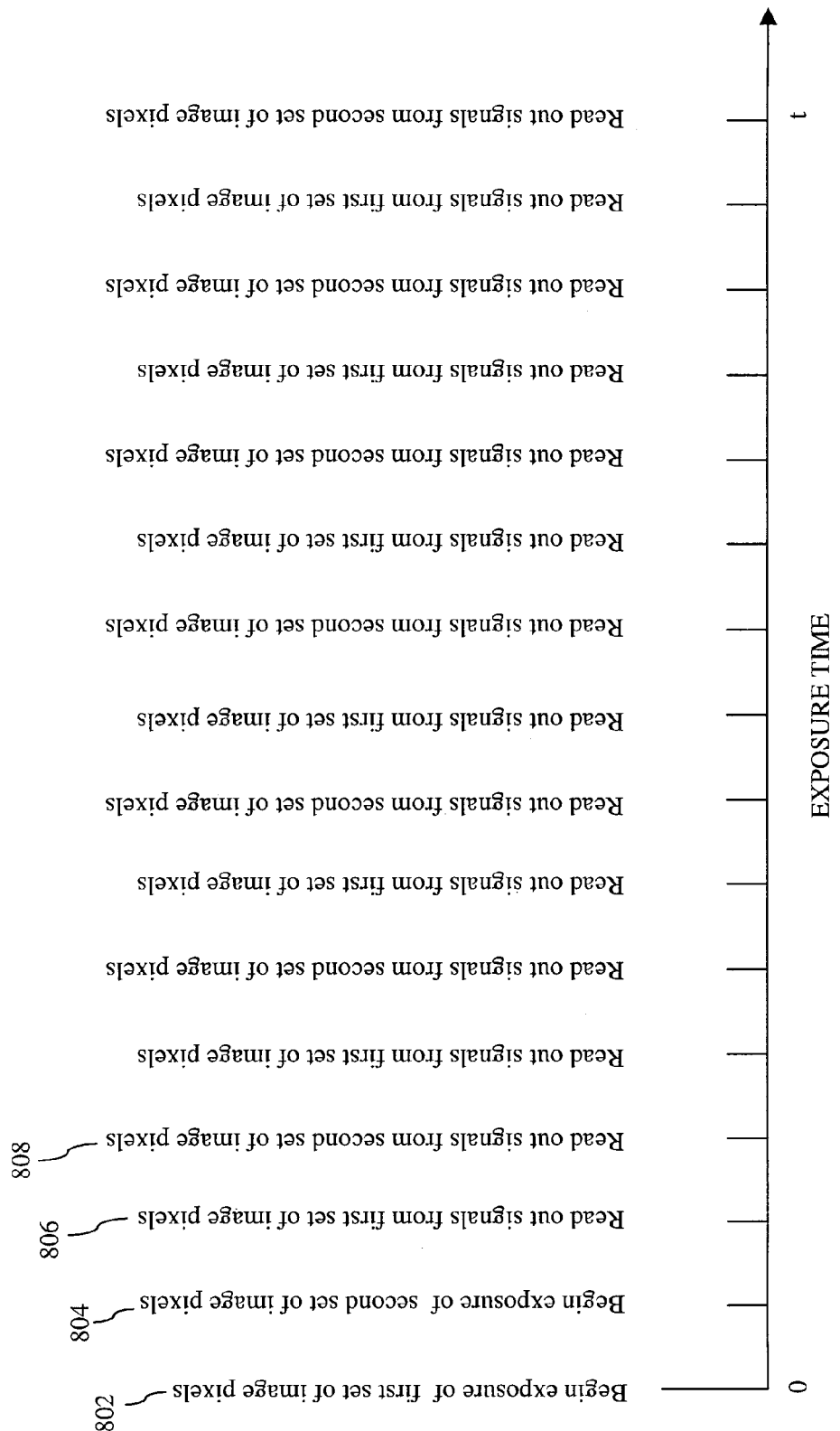
FIG. 8 illustrates another example of the readouts of the first and second sets of image pixels, according to an embodiment of the present invention.

FIG. 8 depicts an exemplary method for image sensor readout corresponding to the pixel sets described in FIG. 4. At time 0, the exposure of the first set of image pixels 402 begins 802. Image element signals from the first set of image pixels are subsequently read out multiple times at uniform exposure lengths 806. Image element signals from the second set of image pixels are exposed 804 and read out 808 in a similar fashion, staggered in relation to the signals from the first set of image pixels. In one embodiment, the signal-readouts of the second set of image pixels are evenly spaced in time between consecutive readouts of signals from the first set of image pixels, although this is not a limitation.

Signal readouts from both the first set and second set of image pixels are then used for motion estimation. An exemplary method for computing the global translational motion between consecutive readouts is the technique of integral projections, as described in US Patent Application 2006/0274156A1 "Image Sequence Stabilization Method and Camera Having Dual Path Image Sequence Stabilization," by Rabbani et al, and also illustrated in FIG. 9.

Figure 9:
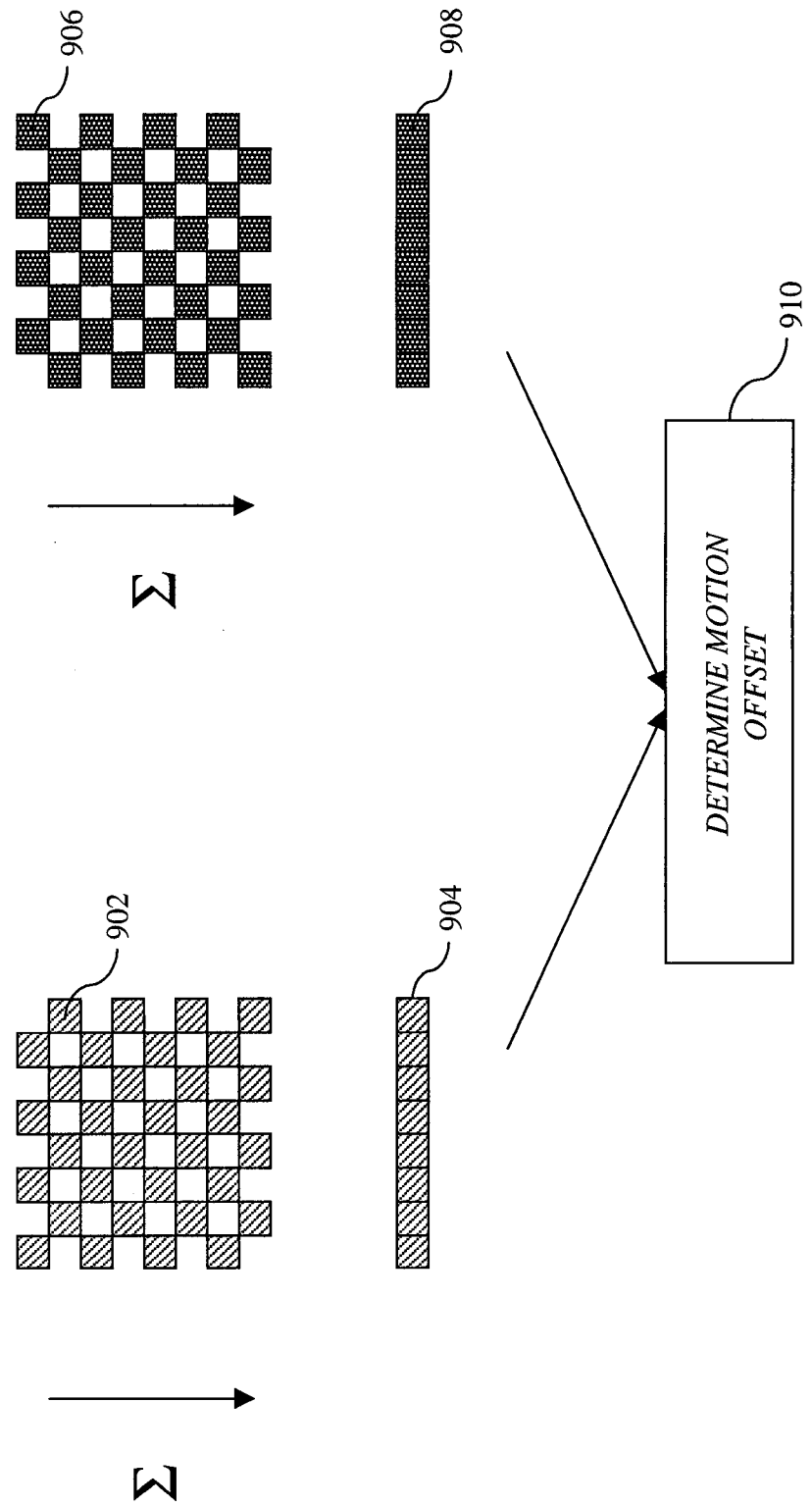
FIG. 9 illustrates the technique of integral projections to estimate the motion between readouts from a first and second set of image pixels.

In FIG. 9, image element signals from a readout of the first set of image pixels 902 are aggregated along the vertical axis, to form a single horizontal vector 904. Similarly, image element signals from a readout of the second set of image pixels 906 are aggregated along the vertical axis, to form a single horizontal vector 908. These two vectors are subsequently compared to determine a horizontal motion offset between the two sets of data 910. Those skilled in the art will recognize that there are many suitable methods by which to compute a relative motion value between two vectors, including determining the offset of highest correlation.

FIG. 9 illustrates the computation of a horizontal motion offset between two sets of image element signals. A vertical motion offset can be computed in a similar manner by aggregating data along the horizontal axis to form a single vertical vector representing each set of image element signals.

In FIG. 9, the two sets of image element signals used for motion estimation are from consecutive readouts, the first readout derived from the first set of image pixels, the second readout derived from the second set of image pixels. However, this is not meant to be limiting, and in general, the two readouts may be any two readouts during the exposure period.

The technique of integral projections as described in FIG. 9 can also be applied to other image sets, such as described in FIG. 5. In the case that a given signal readout contains no data for a particular row (for vertical motion estimation) or column (for horizontal motion estimation), the aggregated signal vector can be interpolated to fill in data values for the missing rows or columns.

Depending on the spectral sensitivity of the sensor, two image pixel sets used in motion estimation may or may not have the same spectral sensitivity. For example, the first set of image pixels may comprise only panchromatic pixels, while the second set of image pixels may comprise red, green and blue pixels. In such a case, some signal processing may be necessary to match the signals from the two pixel sets prior to motion estimation. In the above scenario, signals from the green pixels may be used as an approximation to signals from the panchromatic pixels, and simply scaled to match the overall intensity. In another method, signals from the green, blue and red pixels can be color interpolated and transformed to a luminance-chrominance representation, and the luminance data can be used as an approximation of the panchromatic representation.

The motion estimates between consecutive readouts of signals from sets of image pixels are then combined to form a function of the global motion during the exposure interval [0,t]. As described previously, there are many ways of deriving such a function. Given the global motion function, signals from the multiple sets of image pixels are processed to form the final output image.

There are many methods by which signals from the sets of image pixels may be processed. One such exemplary method is to initially enhance each set of image-element signals independently. A deconvolution algorithm can be applied to any set of image-element signals for which there was substantial imaging device motion during its exposure period. More basic sharpening algorithms can be applied to any set of image-element signals for which there was only mild imaging device motion during its exposure. In each case, the set of image-element signals may be interpolated to fill the holes, so that data exists at every sensor pixel location prior to the sharpening or deconvolution step. After processing of the individual sets of image-element signals is completed, the processed data may then be motion-aligned and aggregated to form the final output image. This step may also include a temporal filter, for example median or sigma filter, to ensure that the aggregate image does not contain blurring or ghosting artifacts resulting from incorrect motion estimation or local object motion. The data may also be processed such that any image data corresponding to periods of extreme imaging device motion may be excluded from further processing and also excluded from contributing to the final assembled image.

The pixel sets described in FIG. 4 may also be read out according to the sequence described in FIG. 6. In this case, the first pixel set is read multiple times, and is used for estimation of the camera motion, using, for example, the technique of integral projections as described previously. The second pixel set is read only once, at the conclusion of the exposure period. The second pixel set may be defined as in FIG. 4, or it may alternatively be defined to comprise all pixels on the sensor. Since the data available at the first pixel set locations is noisy due to multiple read outs, replacement pixel values at these locations can be computed using the pixel values from the second set of image pixels. Pixel values at locations corresponding the first set of image pixels can be computed by interpolation of neighboring values from the second set of image pixels. For example, in the case of a monochrome sensor, bilinear interpolation of the four nearest neighbors can be used to construct pixel values at locations corresponding to the first set of image pixels. In general, fewer pixel locations than shown in FIG. 4 can be allocated to the first set of image pixels, with the tradeoff that less accurate motion estimation is possible, but fewer pixel locations contain interpolated data. After interpolation, deconvolution algorithms can be applied to the entire image as described previously according to the computed motion estimates.

Figure 10:
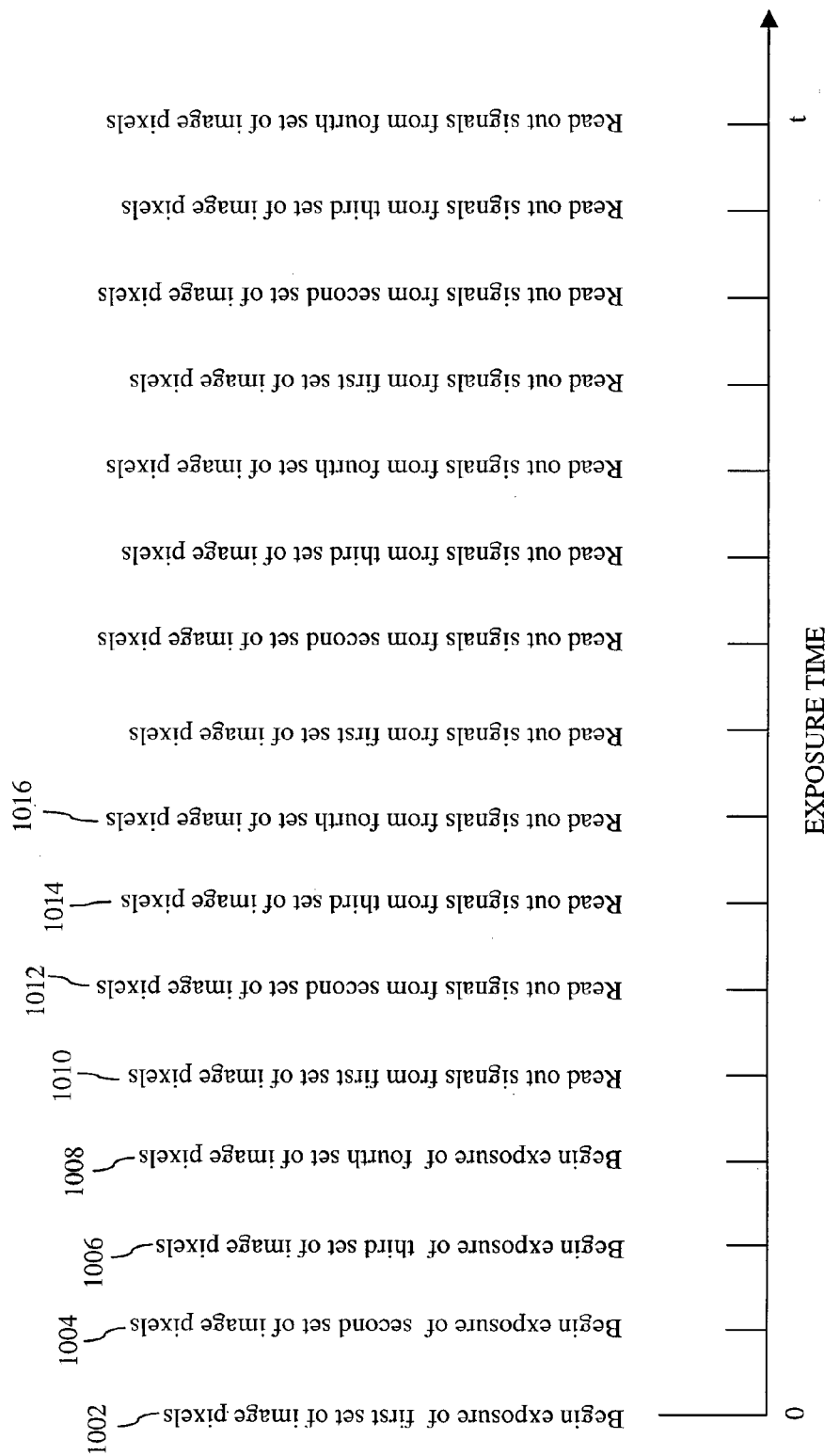
FIG. 10 illustrates an example of the readouts of the first, second, third and fourth sets of image pixels, according to an embodiment of the present invention.

FIG. 10 depicts an exemplary method for image sensor readout corresponding to the pixel sets described in FIG. 5. At time 0, the exposure of the first set of image pixels 502 begins 1002. Signals from the first set of image pixels are subsequently read out multiple times at uniform exposure lengths 1010. Signals from the second set of image pixels are exposed 1004 and read out 1012 in a similar fashion, staggered in relation to the first set of image pixels. Similarly, signals from the third set of image pixels are exposed 1006 and read out 1014, staggered in relation to the first set of image pixels. Similarly, signals from the fourth set of image pixels are exposed 1008 and read out 1016, staggered in relation to the first set of image pixels. In one embodiment, the readouts from the third set of image pixels are evenly spaced in time between consecutive readouts from the first set of image pixels, the readouts from the second set of image pixels are evenly spaced between readouts from the first set of image pixels and readouts from the following third set of image pixels, and the readouts from the fourth set of image pixels are evenly spaced between readouts from the third set of image pixels and readouts from the following first set of image pixels, though this is not a limitation.

Readouts from all four sets of image pixels are then used for motion estimation, using for example, the techniques described previously in reference to FIG. 8. As with the example associated with FIG. 8, there are also many methods by which image-element signals from sets of image pixels may be processed. One such exemplary method is to initially enhance each set of image-element signals. A deconvolution algorithm can be applied to any set of image-element signals for which there was substantial imaging device motion during its exposure period. More basic sharpening algorithms can be applied to any set of image-element signals for which there was only mild imaging device motion during its exposure. In each case, the set of image-element signals may be interpolated to fill the holes, so that data exists at every sensor pixel location prior to the sharpening or deconvolution step. Each set of image-element signals may also be treated as a 2×2 downsampling of the sensor image data, and the processing may be performed at that resolution with the intention of creating a final output image with reduced resolution, or of interpolating back up to the full sensor resolution only after all other processing is completed. After processing of the individual sets of image-element signals is completed, the processed data may then be motion-aligned and aggregated to form the final output image. This step may also include a temporal filter, for example median or sigma filter, to ensure that the aggregate image does not contain blurring or ghosting artifacts resulting from incorrect motion estimation or local object motion. The data may also be processed such that any image data corresponding to periods of extreme imaging device motion may be excluded from further processing and also excluded from contributing to the final assembled image.

Motion estimates may also be used for additional purposes, such as alerting the imaging device user than the captured image is potentially of low image quality as a result of excessive imaging device motion during exposure.

It is to be understood that the exemplary embodiments are merely illustrative of embodiments of the present invention and that many variations of the above-described embodiments can be devised by one skilled in the art without departing from the scope of the invention. It is therefore intended that all such variations be included within the scope of the following claims and their equivalents.

PARTS LIST

3 Zoom lens
5 Zoom and focus motors
10 Digital imaging device
13 Clock drivers
14 Image sensor
18 Analog output signal
22 Analog signal processor and analog to digital converter
36 DRAM buffer memory
40 Control processor and timing generator
42 User controls
48 Electronic flash
50 Image processor
52 Memory card interface
54 Removable memory card
56 RAM memory
58 Firmware memory
62 Host interface
64 Interconnection
66 Host PC
70 Color LCD image display
90 Cellular processor
92 Cellular modem
94 Antenna
201 Step of defining multiple sets of image pixels on the image sensor
202 Step of beginning image capture
204 Step of readout of signals from each set of image pixels one or more times
206 Step of computation of motion estimates using readouts of signals from one or more sets of image pixels
208 Step of processing one or more sets of signals from image pixels to form output digital image
302 First set of image pixels
304 Second set of image pixels
306 Output image area
308 Sensor image area
402 First set of image pixels
404 Second set of image pixels
406 Output image area
408 Sensor image area
502 First set of image pixels
504 Second set of image pixels
506 Third set of image pixels
508 Fourth set of image pixels
510 Output image area
512 Sensor image area
601 Step of beginning exposure of image pixels
602 Step of readout of signals from first set of image pixels
604 Step of readout of signals from second set of image pixels
702 Corresponding blocks from consecutive readouts of the first set of image pixels
704 Sub-block used as motion estimation reference
706 Sub-block match compared to reference sub-block
708 Motion estimation search range
802 Step of beginning exposure of first set of image pixels
804 Step of beginning exposure of second set of image pixels
806 Step of readout of signals from first set of image pixels
808 Step of readout of signals from second set of image pixels
902 Signals from readout of first set of image pixels
904 Aggregation along vertical axis of signals from readout of first set of image pixels
906 Signals from readout of second set of image pixels 908 Aggregation along vertical axis of signals from readout of second set of image pixels
910 Step of determining motion offset between two vectors
1002 Step of beginning exposure of first set of image pixels
1004 Step of beginning exposure of second set of image pixels
1006 Step of beginning exposure of third set of image pixels
1008 Step of beginning exposure of fourth set of image pixels
1010 Step of readout of signals from first set of image pixels
1012 Step of readout of signals from second set of image pixels
1014 Step of readout of signals from third set of image pixels
1016 Step of readout of signals from fourth set of image pixels

What is claimed is:

1. A method for determining motion of an imaging device during acquisition of an image and assembling the image, the imaging device including an image sensor comprising a plurality of image element acquisition devices, the method implemented at least in part by a data processing system and comprising the steps of:
identifying a contiguous first set of the image element acquisition devices, comprising some, but not all of the plurality of image element acquisition devices, at least partially by an analysis of an image scene comprising all of the plurality of image element acquisition devices prior to initiating a capture of the first set of the image element acquisition devices;
identifying a second set of the image element acquisition devices comprising remaining image element devices and the first set, wherein the first set is a subset of the second set;
beginning acquisition of the image on the image sensor;
reading out image element signals from the first set of the image element acquisition devices two or more times;
concluding acquisition of the image on the image sensor;
reading out image element signals from the second set of image element acquisition devices;
determining motion of the imaging device based at least upon a comparison of the two or more readouts of image element signals from the first set of image element acquisition devices;
storing information identifying the determined motion in a processor-accessible memory system; and
assembling an image based at least upon (a) the information identifying the determined motion, (b) at least a portion of the image element signals from one of the readouts of the first set of image element acquisition devices and (c) at least a portion of the image element signals from the readout of the second set of image element acquisition devices.

2. The method of claim 1, wherein a first readout of image element signals from the first set of image element acquisition devices occurs prior to a second readout of image element signals from the same respective image element acquisition devices in the first set of image element acquisition devices.

3. The method of claim 1, wherein the readout of image element signals from the second set of image element acquisition devices occurs after the two or more readouts of image element signals from the first set of image element acquisition devices.

4. The method of claim 1, wherein the image element signals from the first set of image element acquisition devices are generated by a destructive readout of corresponding image element acquisition devices, after the beginning acquisition of the image on the image sensor.

5. The method of claim 1, wherein the image element signals from the first set of image element acquisition devices are generated by a non-destructive readout of corresponding image element acquisition devices.

6. The method of claim 1, wherein the information identifying the determined motion represents a translational motion during acquisition of the image.

7. The method of claim 1, further comprising the step of: instructing execution of an image processing procedure acting on at least the image element signals from the second set of image element acquisition devices or signals derived therefrom, based at least upon the determined motion.

8. The method of claim 7, wherein the image processing procedure includes:
a deblurring procedure;
spatial alignment of at least some of the image element signals;
sharpening of at least some of the image element signals; or
exclusion of at least some of the image element signals from contributing to the assembled image.

9. A method for determining motion of an imaging device during acquisition of an image and assembling the image, the imaging device including an image sensor comprising a plurality of image element acquisition devices, the method implemented at least in part by a data processing system and comprising the steps of:
identifying a contiguous first set and a second set of image element acquisition devices on the image sensor that are mutually exclusive at least partially by an analysis of an image scene comprising all of the plurality of image element acquisition devices prior to initiating a capture of the first set of the image element acquisition devices;
beginning acquisition of the image;
reading out image element signals from the first set of the image element acquisition devices;
reading out image element signals from the second set of the image element acquisition devices;
determining motion of the imaging device based at least upon a comparison of the image element signals from the readouts of the first and second sets of image element acquisition devices;
storing information identifying the determined motion in a processor-accessible memory system; and
assembling an image based at least upon (a) the information identifying the determined motion, (b) at least some of the image element signals from both the first and second sets of image element acquisition devices.

10. The method of claim 9, wherein the image element signals from the first set of image element acquisition devices are readout prior to or after the image element signals from the second set of image element acquisition devices are readout.

11. The method of claim 9, further comprising the steps of:
identifying a third set of image element acquisition devices on the image sensor that is mutually exclusive to (a) the first set of the image element acquisition devices, and (b) the second set of the image element acquisition devices,
reading out image element signals for the third set of image element acquisition devices during a period of time between readouts of the image element signals from the respective image element acquisition devices for the first and second sets of image element acquisition devices.

12. The method of claim 9, further comprising the step of: instructing execution of an image processing procedure acting on at least the image element signals from the second set of image element acquisition devices or signals derived therefrom and based at least upon the determined motion.

13. The method of claim 9, wherein the image element signals from the first set of image element acquisition devices are generated by a destructive readout of corresponding image element acquisition devices, after the beginning acquisition of the image on the image sensor.

* * * * *